Nov. 16, 1926.
I. MARGOLIUS
COTTON BALE PATCH
Filed Dec. 21, 1925
1,607,406
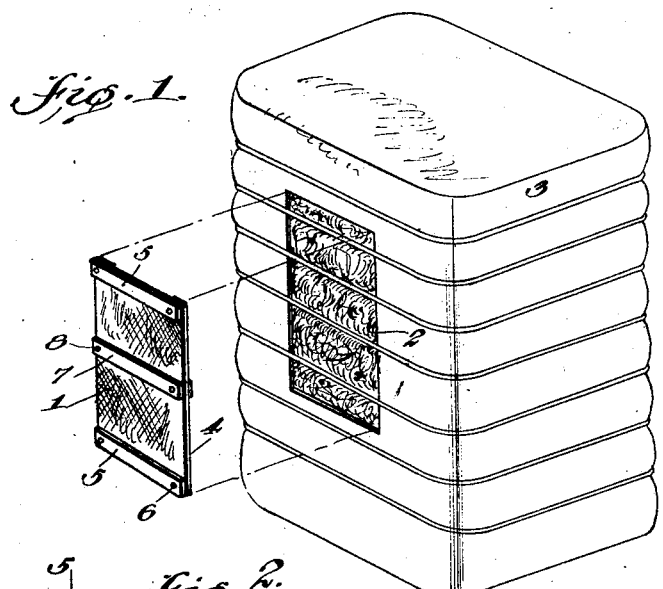
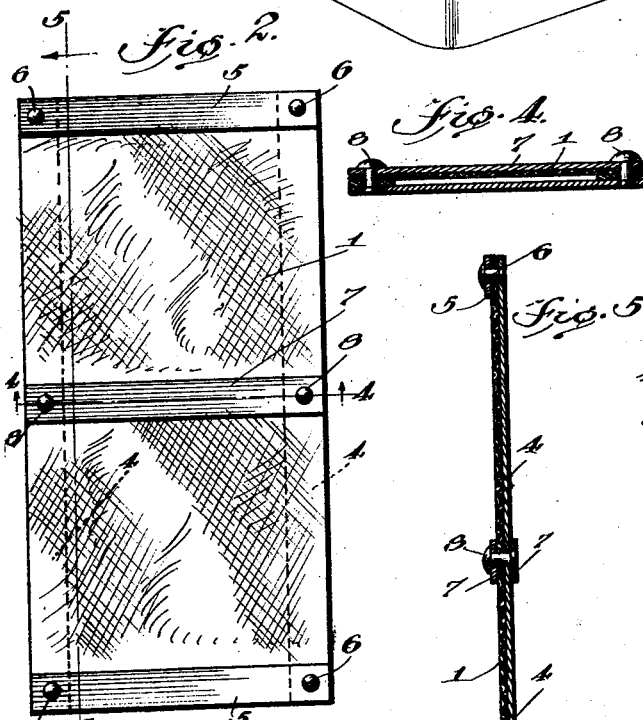
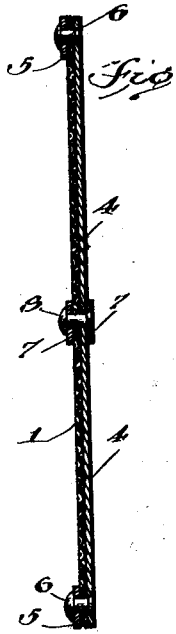
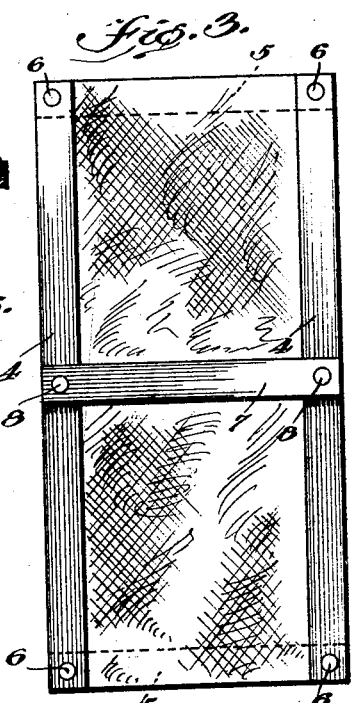
INVENTOR
Isidor Margolius,
BY
ATTORNEYS Patented Nov. 16, 1926.

1,607,400

UNITED STATES PATENT OFFICE.

ISIDOR MARGOLIUS, OF NORFOLK, VIRGINIA.

COTTON-BALE PATCH.

Application filed December 21, 1925. Serial No. 76,911.

My invention relates to improvements in cotton bale patches, and it consists in the combinations, constructions and arrangements herein described and claimed.

In order to obtain a sample of the cotton within a bale of cotton, it is customary to cut an opening in the cover of the cotton bale through which a sample is removed. It then is necessary to close the opening in the cover of the cotton bale to prevent loss of cotton from the bale and it is usual to place a piece of jute or other heavy fabric in position to close the opening in the cover of the cotton bale. This piece or patch of fabric may be deformed, displaced or ruptured at the time the bale of cotton is compressed or may be displaced after the bale has been compressed since it is held in place by the usual tie members or bands which encircle the cotton bale.

An object of the invention is to provide a patch or closure for an opening in the cover of a cotton bale which will retain its form under any pressure to which it is likely to be subjected when in use and which can be conveniently handled so that it can be quickly and easily placed in position to close an opening in the cover of a bale of cotton.

A further object of the invention is the provision of a patch or closure of the character described which is stronger and more durable than any prior patch or closure of the same character of which I am aware and which is not so likely to be displaced from a desirable position on a bale of cotton after the bale of cotton has been compressed.

Other objects and advantages of the invention will be apparent from the following description, considered in conjunction with the accompanying drawings, in which—

Figure 1 is a perspective view of a compressed bale of cotton having an opening in the cover thereof together with a patch for closing the opening, the patch being displaced from position to close the opening in the bale cover for the sake of clearness of illustration, Figure 2 is a face view of the improved patch, Figure 3 is a view similar to Figure 2, showing the reverse face of the patch, Figure 4 is a section on the line 4—4 of Figure 2, and Figure 5 is a section along the line 5—5 of Figure 2.

A patch embodying the invention comprises a panel or closure sheet 1 which is made of a suitable material, such as jute, burlap or other suitable fabric and which conforms substantially in configuration and area to an opening 2 in the cover 3 of a bale of cotton with which the patch is to be used. The opening 2 is shown as being rectangular, as is usual, and the sheet 1 likewise is rectangular. The sheet 1 is held in extended form and in shape by a strengthening and supporting frame. This frame comprises a pair of longitudinal or side flat elongated metallic members or bars 4 on which the longitudinal or side edge portions of the sheet 1 are superimposed, the side edges of the sheet 1 being flush with the outer side edges of the members 4 and the end edges of the sheet 1 also being flush with the end edges of the members 4. The strengthening and carrying frame also includes a pair of flat elongated metallic transverse or end members 5 which respectively are superimposed on the opposite end portions of the sheet 1 so that the outer longitudinal edges of the members 5 are flush with the end edges of the sheet 1 and the end edges of the members 5 with the outer longitudinal edges of the members 4 and the side edges of the sheet 1. The end portions of the end members 5 therefore will clamp the corner portions of the sheet 1 flatwise against the end portions of the members 4 and the sheet 1 will be firmly held in flat or extended form when fastening devices, such as the rivets 6 are employed to connect superposed portions of the end members 5, the sheet 1, and the side members 4.

A pair of other transverse metallic members 7, which are similar to the end transverse members 5, respectively are disposed flatwise against opposite faces of the sheet 1 intermediate the length of the latter, the end portions of the respective members 7 being connected with each other and with the portions of the side members 4 and the portions of the sheet 1 which are disposed therebetween by suitable fastening devices, such as the rivets indicated at 8. The sheet 1 therefore will be secured to the frame at the corners of the sheet and intermediate the length of side edge portions of the sheet. All marginal edge portions of the sheet 1, therefore will be held against any appreciable movement from position to rest flatwise against flat relatively stiff metallic frame members. The sheet 1 therefore is strongly reinforced.

From the foregoing description of the various parts of the device, the operation thereof may be readily understood. Assuming that the patch is placed in position to close the opening 2 in the cover 3 of a bale of cotton before the bale is compressed, it will be obvious that any stress which the sheet 1 of the patch receives during the compression of the bale will be distributed uniformly throughout the area of the sheet and moreover the sheet 1 will be protected by the members of the frame from stresses which otherwise would be imposed on the sheet or a like member when the bale is compressed. I therefore may use a relatively light fabric as the closure sheet 1 of the improved patch and since a light weight fabric, such as burlap, usually is lighter in color than a heavier similar fabric, the sheet 1 is adapted to have more readily distinguishable and clearer characters stenciled thereon than any prior cotton bale patch, of which I am aware. It is customary to stencil the cotton bale patches. Moreover, the improved patch cannot roll up or be otherwise displaced to close an opening in the cover of the cotton bale, as may easily occur when an unsupported strip of jute or other similar fabric is employed to close an opening in the cover of the cotton bale, as is usual. The patch can be quickly and easily handled, will take up but little room when packed for storage or shipment and a plurality of the improved patches can be stacked quickly and easily without likelihood of collapse of the stack of patches.

Obviously, my invention is susceptible of embodiment in forms other than that which is illustrated in the accompanying drawing and I therefore consider as my own all such modifications and adaptations of said form thereof as fairly fall within the scope of the appended claims.

I claim:—

1. A patch of the character described comprising a sheet of flexible material, a frame comprising a pair of flat elongated metallic side members on which the side edge portions of said sheet are superimposed, a pair of elongated flat metallic transverse members superimposed on the end edge portions of said sheet, the end portions of said end members overlying the end portions of said side members of the frame and pressing the corner portions of said sheet against the end portions of said side members of the frame, fastening devices connecting the superposed portions of said end frame members, said sheet of flexible material, and said side members of the frame, a pair of other transverse members similar to said end members of the frame, said last named transverse members extending across opposite faces of the sheet and terminating at their ends flush with the outer side edges of said longitudinal frame members and with the side edges of said sheet, and other fastening devices securing the end portions of the last named transverse members to the interposed portions of the sheet and the side members of the frame and connecting said last named transverse members to each other.

2. A patch of the character described comprising a sheet of flexible material, a frame comprising a pair of flat elongated metallic side members on which the side edge portions of said sheet are superimposed, a pair of elongated flat metallic transverse members disposed on the end edge portions of said sheet, the end portions of said end members overlying the end portions of said side members of the frame and pressing the corner portions of said sheet against the end portions of said side members of the frame, fastening devices connecting the superposed portions of said end frame members, said sheet of flexible material and said side members of the frame, and an additional transverse frame member extending across said sheet intermediate said first named end members of the frame, the end portions of said last named transverse member being secured to said side frame members and to the portions of said sheet which are interposed between the end portions of the last named transverse frame member and the underlying portions of said side frame members.

ISIDOR MARGOLIUS.